(12) United States Patent
Bestler et al.

(10) Patent No.: US 11,372,088 B2
(45) Date of Patent: Jun. 28, 2022

(54) OPTICAL DISTANCE METER HAVING SWITCHABLE RECEIVING APERTURE

(71) Applicant: HEXAGON TECHNOLOGY CENTER GMBH, Heerbrugg (CH)

(72) Inventors: Simon Bestler, Langenargen (DE); Rainer Wohlgenannt, Klaus (AT); Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 892 days.

(21) Appl. No.: 16/195,649

(22) Filed: Nov. 19, 2018

(65) Prior Publication Data

US 2019/0162825 A1 May 30, 2019

(30) Foreign Application Priority Data

Nov. 28, 2017 (EP) .................................... 17204214

(51) Int. Cl.
| | | |
|---|---|---|
| *G01S 7/481* | (2006.01) | |
| *G01S 7/48* | (2006.01) | |
| *G01S 17/08* | (2006.01) | |
| *G01S 17/66* | (2006.01) | |

(52) U.S. Cl.
CPC ........... *G01S 7/4811* (2013.01); *G01S 7/4808* (2013.01); *G01S 7/4816* (2013.01); *G01S 7/4817* (2013.01); *G01S 7/4818* (2013.01); *G01S 17/08* (2013.01); *G01S 17/66* (2013.01)

(58) Field of Classification Search
CPC .... G01S 7/4811; G01S 7/4808; G01S 7/4817; G01S 7/4818; G01S 17/08; G01S 17/66; G01S 7/4816; G02F 1/29; G02B 26/10
See application file for complete search history.

(56) References Cited

U.S. PATENT DOCUMENTS

| | | | | |
|---|---|---|---|---|
| 4,129,775 | A | | 12/1978 | O'Meara |
| 4,432,640 | A | * | 2/1984 | Grage ................... G01S 7/4972 356/4.02 |
| 9,791,566 | B2 | * | 10/2017 | Winter ................... G02B 15/04 |
| 10,444,361 | B2 | * | 10/2019 | Luthi ....................... G01S 17/10 |
| 2007/0242258 | A1 | | 10/2007 | Hindering et al. |

(Continued)

FOREIGN PATENT DOCUMENTS

| | | |
|---|---|---|
| CN | 1894593 A | 1/2007 |
| DE | 10 2015 218 822 A1 | 3/2017 |

(Continued)

OTHER PUBLICATIONS

European Search Report dated May 22, 2018 as received in Application No. 17 20 4214.

*Primary Examiner* — Luke D Ratcliffe
*Assistant Examiner* — Woohyeong Cho
(74) *Attorney, Agent, or Firm* — Maschoff Brennan (57) ABSTRACT

An optical distance meter configured to carry out a distance measurement in a first measuring mode, in which the distance meter is set for distance measurement on a retroreflective target, and a second measuring mode, in which the distance meter is set for distance measurement on a diffusely scattering target. In this case, a first aperture of the receiving channel is set in the first measuring mode, which is smaller than an aperture set in the second measuring mode.

20 Claims, 5 Drawing Sheets

(56) References Cited

U.S. PATENT DOCUMENTS

| | | | | |
|---|---|---|---|---|
| 2014/0226145 A1* | 8/2014 | Steffey | ............... | G01S 7/4813 356/4.01 |
| 2017/0307757 A1 | 10/2017 | Hinderling et al. | | |
| 2019/0187285 A1* | 6/2019 | Yang | ............... | G01S 17/10 |

FOREIGN PATENT DOCUMENTS

| | | | | |
|---|---|---|---|---|
| EP | 1 916 545 A1 | 4/2008 | | |
| EP | 3182159 A1 * | 6/2017 | ......... | G01S 7/4817 |
| EP | 3 236 282 A1 | 10/2017 | | |

* cited by examiner

OPTICAL DISTANCE METER HAVING SWITCHABLE RECEIVING APERTURE

CROSS-REFERENCE TO RELATED APPLICATIONS

This application claims priority to European Patent Application No. 17204214.5 filed on Nov. 28, 2017, which is incorporated herein by reference.

Field of the Invention

Background

SUMMARY

The invention relates to an optical distance meter for carrying out a distance measurement both on retroreflective targets and also on diffusely scattering targets.

The optical distance meter according to the invention is suitable, for example, for distance and coordinate measuring devices in the fields of geodesy and industrial measurement, where typically LIDAR, laser trackers, laser scanners, total stations, or theodolites are used.

For example, such measuring devices have an accuracy of 100 μm or better. Laser trackers are equipped, for example, with distance meters which achieve an accuracy of 3-5 μm in the case of a measurement on retroreflective target marks. In the case of reflector-less target objects, for example, optically matte surfaces, this measuring accuracy is typically no longer ensured, in particular since the collecting capability of the receiving optical unit is typically not sufficient.

Such laser trackers are used, for example, in industrial measurement, for example, for the coordinative position determination of points of a component such as a vehicle body, for example, in the scope of an inspection or for the progressive position monitoring of a moving machine part. Such laser trackers are typically designed for a coordinative position determination of a retroreflective target point and typically for progressive tracking of this target point. A target point can be represented in this case by a retroreflective unit (for example, corner cube prism), which is targeted using an optical measuring beam, in particular a laser beam, generated by a radiation source of the measuring device or the distance meter of the measuring device. The laser beam is reflected in parallel back to the measuring device, wherein the reflected beam is registered using registration means of the measuring device or the distance meter, respectively. An emission or reception direction of the beam is ascertained in this case, for example, by means of sensors for angle measurement, which are associated with a deflection mirror or a targeting unit of the system. In addition, a distance from the measuring device to the target point is ascertained with the capture of the beam, for example, by means of runtime or phase difference measurement, by means of an optical interferometer, or by means of the Fizeau principle. The position coordinates of the target point are determined on the basis of the emission or reception direction and the distance.

Moreover, in modern tracker systems, an offset of the received measuring beam from a zero position is ascertained on a fine targeting sensor. By means of this measurable offset, a position difference between the center of a retroreflector and the point of incidence of the laser beam on the reflector can be determined and the alignment of the laser beam can be corrected and/or tracked in dependence on this deviation such that the offset on the fine targeting sensor is reduced, in particular is "zero", and therefore the beam is aligned in the direction of the reflector center. By way of the tracking of the laser beam alignment, progressive target tracking (tracking) of the target point can be performed and the distance and position of the target point can be progressively determined in relation to the measuring device. The tracking can be implemented in this case by means of an alignment change of the deflection mirror, which is movable by motor and is provided for deflecting the laser beam, and/or by a pivot of the targeting unit, which has the beam-guiding laser optical unit. In the case of rapid movements of the target object, the progressive target tracking (tracking) is often not exact, which results in an angle offset from the ideal, calibrated measurement direction. This direction difference can be measured in real time and taken into consideration by means of the fine targeting sensor, however, which generally has a camera. Distance and position, and/or the coordinates of the target point, are thus progressively known.

The target point or the retroreflector, respectively, can be attached in this case to a measuring aid instrument, for example, a so-called scanning tool, which is positioned with a contact point on a point of the object to be measured. The scanning tool has markings, for example, light spots, and a reflector, which represents the target point on the scanning tool and is targetable using the laser beam of the tracker, wherein the positions of the markings and the reflector in relation to the contact point of the scanning tool are precisely known.

It is not possible using conventional laser trackers of the prior art to measure distances without the use of measuring aids having a retroreflector, i.e., a measurement directly in relation to a surface of an object to be measured.

In contrast, special laser trackers exist which enable scanning measurement of surface points, i.e., a determination of very many point coordinates on the surface of an object to be measured, which takes place in a comparatively short time. For this purpose, however, accuracy losses have to be accepted in comparison to the measurement of retroreflective targets.

US 2014/0226145 A1 discloses a laser tracker, which can measure both a retroreflective target and also a natural (i.e., non-retroreflective) surface. For this purpose, the laser tracker has a first absolute distance meter, which is designed as known for measurement in relation to a retroreflector. In addition, the laser tracker has a second absolute distance meter, which is designed for measurement in relation to an object surface. The respective absolute distance meters do emit the measurement radiation thereof through a single exit optical unit, but are each separate, independent units. The necessity of providing two completely independent, separate absolute distance meters is complex in production and thus costly.

To ensure the required high sensitivity for the capture of the comparatively weak returning signals in the case of reflector-less measurements, for example, the cross section of the receiving optical unit has to be designed as large as possible. Retroreflective target objects generally have a small diameter, however, for example, between 10 mm and 40 mm.

In the case of so-called incorrect targeting in relation to the retroreflector, a parallel beam offset results and the received beam can therefore be incident laterally in different ways on a receiving objective designed as large, depending on the targeting, which can result in distance measurement errors, typically characterized by a so-called misalignment diagram.

To compensate for the intensity differences of the returning radiation in the case of measurements on retroreflective targets in relation to measurements on natural, diffusely scattering targets, for example, adjustable attenuation filters are used in the transmitting channel to adapt the emitted signal amplitude to the electronic receiving unit.

Furthermore, in the case of reflective, in particular retroreflective targets, multiple reflections between target object and instrument or multiple reflections within the receiving channel of the distance meter can occur. The probability of such multiple reflections is proportional to the size of the receiver-side field of vision (RX-FoV). Such parasitic signal components ("boomerang signals") interfere with the measurement accuracy. These boomerang signals are still sufficiently strong, for example, to prevent a measurement accuracy of better than 100 µm even in the case of a small receiver-side field of vision (RX-FoV). On the receiver side, for example, special anti-boomerang filters are therefore used as fixed filters or as adjustable attenuation filters in the case of distance meters measuring on retroreflectors. As fixed filters, however, these anti-boomerang filters would interfere with measurements on natural targets, since the signal is already weak in any case and multiple reflections do not occur between target object and instrument anyway.

Moreover—primarily in the case of receiver-side fixed focus arrangements—shadows of the received light generally occur at close range (for example, <5 m) in known coaxial but also biaxial distance measuring arrangements from the prior art. Such shadows are generated, for example, by transmitted beam mirrors placed on the optical axis, which block the view of the reception diode on the light spot at the target object at close range. These fixed focus arrangements have the result that practically no signal is captured by the receiver in a very close distance range of 0 m up to a certain limit distance. Such non-measurable distance ranges are interfering and obstruct the workflow of the respective measurement task.

It is therefore the object of some embodiments of the present invention to provide an improved optical distance meter which enables the measurement both in relation to a retroreflective target and also a diffusely scattering target and whereby the disadvantages known from the prior art are avoided.

This object is achieved by the implementation of the characterizing features of the independent claim. Features which refine the invention in an alternative or advantageous manner can be inferred from the dependent patent claims.

Some embodiments of the invention relate to an optical distance meter, in particular for use in a laser tracker, a laser scanner, a total station, or a theodolite, having a transmitter which is configured to generate an oriented, in particular substantially collimated, transmitted beam defining a target axis, a receiver, which is configured to capture at least a part of the transmitted beam returning from the target, referred to hereafter as received radiation, and a receiving channel substantially defining a single capture direction for capturing the received radiation. The distance meter is configured to carry out a distance measurement in a first measuring mode, in which the distance meter is set for distance measurement on a retroreflective target, and a second measuring mode, in which the distance meter is set for distance measurement on a diffusely scattering (natural) target.

According to some embodiments of the present invention, the receiving channel is configured such that a first aperture of the receiving channel is set for the capture of the received radiation in the first measurement mode, i.e., a first free opening of the receiving channel through which the part of the received radiation used for the distance measurement in the first measuring mode passes, a second aperture of the receiving channel is set in the second measuring mode, i.e., a second free opening of the receiving channel through which the part of the received radiation used for the distance measurement in the second measuring mode passes, wherein the first aperture is smaller than the second aperture.

For example, the receiving channel is configured such that the ratio between the area of the first aperture and the area of the second aperture is less than 1/10, in particular less than 1/20.

Furthermore, according to one embodiment, the receiving channel has, for example, an attenuation element switchable in dependence on carrying out the first and second measuring mode, namely present differently in the first and second measuring mode, which acts, for example, as a switchable anti-boomerang filter, whereby the measurement accuracy is enhanced. For example, the switchable attenuation element can be designed as a filter pivotable into and out of the receiving channel having a transmission less than 50%, or as a graduated filter wheel.

For example, the receiving channel has a switchable aperture screen defining the first aperture, wherein the switchable aperture screen is configured such that the switchable aperture screen is pivoted into the beam path of the receiving channel in the first measuring mode, or the screen opening of the switchable aperture screen is settable such that the first aperture is set by means of a first setting and the second aperture is set by means of a second setting, in particular wherein the switchable aperture screen is an iris screen.

An effect of the first aperture is, for example, an assistance of an optically sufficiently uniquely defined status, wherein the lengths of the optical paths in the receiving beam path are all interferometrically of equal length. An improvement of the receiver-side misalignment diagram is thus achieved, since the received bundle for measurements on a retroreflector always has the same shape, independently of how accurately the center of the retroreflector is targeted.

The switchable attenuation element and the switchable aperture screen can be arranged, for example, on a common adjustment element of the receiving channel and can therefore be pivoted jointly into the beam path of the receiving channel in the first measuring mode and pivoted jointly out of the beam path of the receiving channel in the second measuring mode, respectively.

According to a further embodiment, the receiving channel has a fixedly arranged attenuation element i.e., identically present in the first and second measuring mode, for attenuating the received radiation passing through the attenuation element. The fixedly arranged attenuation element is configured in this case in its lateral geometry and arranged in its lateral position in the receiving channel such that the fixedly arranged attenuation element attenuates at least the beam bundle of the received radiation passing through the first aperture in the first measuring mode, and in the second measuring mode, received radiation passing through the second aperture has a beam bundle not attenuated by the fixedly arranged attenuation element.

For example, the optical system of the distance meter according to the invention can be designed coaxially, wherein the distance meter has a beam splitter arranged on the optical axis of the receiving channel for coupling the transmitted beam onto an axis coaxial to the optical axis of the receiving channel and corresponding to the target axis. The beam splitter is configured and arranged in this case such that the beam splitter has a partially-transparent layer in a central zone around the optical axis of the receiving channel, in particular wherein a beam splitting ratio of the beam splitter of less than 50% for the receiving channel is generated by means of the partially-transparent layer in the central zone, and the partially-transparent layer forms at least a part of the fixedly arranged attenuation element, in particular wherein the partially-transparent layer forms the fixedly arranged attenuation element.

In contrast to coaxial distance meters from the prior art, which typically use a radiation-opaque mirror element for the coaxial coupling of the transmitted radiation onto the optical axis of the receiving channel, the shadows known from the prior art of the received beam returning from the retroreflector are avoided at close range (for example, <5 m). A special close-range optical unit for measurements on retroreflectors, which is known from the prior art, is thus superfluous in principle due to the fixedly arranged attenuation element.

In a further embodiment, the receiving channel has a correction optical unit defining a correction zone of the receiving channel, in particular configured as a close-range optical unit, for compensation of a focusing error in the focusing of parts of the received radiation returning from a distance shorter than a defined close range limit distance onto the receiver, specifically wherein parts of the received radiation located in the correction zone are deflected by the correction optical unit onto the receiver.

The correction optical unit can be arranged, for example, such that at least a part of the received radiation passing through the second aperture is located within the correction zone, and received radiation passing through the first aperture is located substantially outside the correction zone, wherein the correction optical unit is configured in particular such that the runtime contribution caused on the receiver side to the runtime of the beam bundle of the received radiation inside the correction zone is identical to the runtime contribution caused on the receiver side to the runtime of the beam bundle of the received radiation outside the correction zone.

According to a further embodiment, the fixedly arranged attenuation element, the correction optical unit, and the switchable aperture screen are arranged in relation to one another and configured in the lateral geometry thereof in each case such that, in the first measuring mode, substantially the entire received radiation incident on the receiver is attenuated by the fixedly arranged attenuation element and is located outside the correction zone, and, in the second measuring mode, the aperture screen is pivoted out of the beam path of the receiving channel and received radiation passing through the second aperture has beam bundles not attenuated by the fixedly arranged attenuation element, which are simultaneously located inside the correction zone. In particular, in this case the correction zone has no overlap with an attenuation zone defined by the fixedly arranged attenuation element.

Moreover, the setting of the receiver-side aperture according to the invention can be combined, for example, with a beam-widening optical unit in the transmitting channel, for example, with a negative lens pivotable in the first measuring mode, a perforated screen, or a diffractive optical element. The beam divergence is thus widened, for example, by a factor of 10, and therefore the retroreflected beam irradiates the complete opening of the receiving channel, even if incorrect targeting in relation to the center of the retroreflector is present. Due to the elevation of the transmitter-side divergence, deviations of the modulation wavefront, which determines the runtime, of the optical pulses are locally smoothed by so-called lateral zooming, whereby systematic spatial errors arising due to incorrect targeting in relation to the center of the reflector are reduced in combination with the setting according to the invention of the receiver-side aperture.

For example, the transmitter is configured according to a further embodiment to generate the transmitted beam having a beam divergence in the first measuring mode, and therefore when the distance measurement is carried out at a defined minimum measuring distance, the first aperture is completely illuminated by the received radiation, and the beam divergence is less than five times the receiver-side field of vision angle.

According to another embodiment, the transmitter is configured to set the transmitted beam in a defined variable focusing state, wherein in the first measuring mode, a first focusing state of the transmitted beam is set, wherein the transmitted beam has a divergence in the first focusing state, and in the second measuring mode, a second focusing state of the transmitted beam is set, wherein the transmitted beam in the second focusing state has a substantially parallel beam propagation.

For example, the transmitter can furthermore be configured such that in the first measuring mode, the transmitted beam has a defined settable beam divergence, in particular wherein the beam divergence of the transmitted beam is set based on a distance to the target.

In the case of two adjacent retroreflectors, it has to be ensured that the divergent beam only illuminates one reflector, otherwise the distance measurement is corrupted. Such an interference due to an adjacent target can be avoided by setting the beam divergence in consideration of the lateral distance in relation to an adjacent target.

Furthermore, the transmitting channel of the optical distance meter in a further embodiment has a switchable attenuation element, in particular based on at least one of a settable gray wedge filter, a liquid crystal attenuator, and a fiber-optic Mach-Zehnder interferometer.

The optical distance meter according to some embodiments of the invention will be described in greater detail solely by way of example hereafter on the basis of exemplary embodiments schematically illustrated in the drawings. Identical elements are identified with identical reference signs in the figures. The embodiments described are generally not shown to scale and are also not to be understood as a restriction.

BRIEF DESCRIPTION OF THE DRAWINGS

In the specific figures

DETAILED DESCRIPTION

Figure 1A:
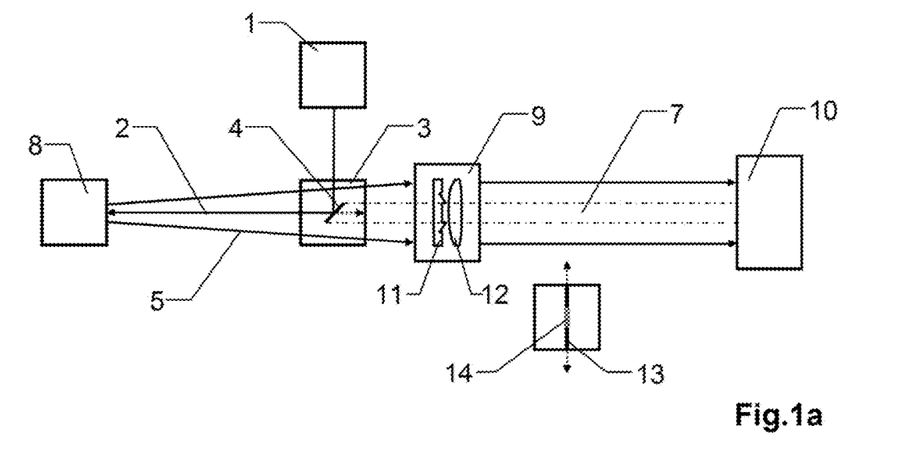
FIGS. 1a, b: show a schematic illustration of an optical distance meter according to the invention configured for the measurement on diffusely scattering targets (a) or on retroreflectors (b), respectively.
Figure 1B:
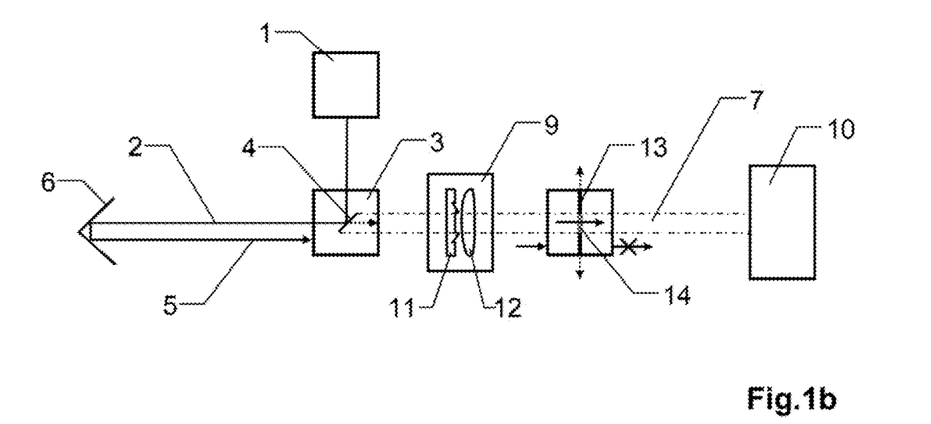

FIGS. 1a and 1b each show schematic illustrations of an optical distance meter according to the invention in a configuration for the measurement on diffusely scattering targets (FIG. 1a) or on retroreflectors, respectively.

In the embodiment shown, the optical system is coaxial, wherein the transmitted beam 2 generated by the transmitter 1 is coupled by means of a beam splitter 3 onto an axis which is coaxial to the optical axis of the receiving channel and corresponds to the target axis. According to the invention, the beam splitter 3 has in this case, for example, a partially-transparent layer at 4, which partially reflects and transmits, in a central zone around the optical axis of the receiving channel.

The beam splitter 3 is thus designed such that it acts as a close-range optical unit for the received beam 5 from a retroreflective object 6, by a central zone 7 having attenuated beam bundles of the received radiation 5 being formed in the receiving channel.

In the case of a measurement on a diffusely scattering target object 8, as shown in FIG. 1a, the target object itself acts as a light source, in contrast to a retroreflection mirror 6. It emits divergent received radiation 5, whereby the entire opening of the receiving objective 9 is struck. A part of the radiation is attenuated by the partially-transparent layer 4 of the beam splitter 3 and is located in the central zone. A larger part of the received radiation 5, however, is located and passes the beam splitter 3 in an outer zone having high transmission, for example, approximately 100%.

If the receiving objective 9 is designed as a fixed focus optical unit, it focuses the radiation solely at distances greater than the headlight limit distance completely onto the receiver 10, for example, a photodiode or an SPAD arrangement ("single-photon avalanche photodiode arrangement", also called SiPM). At short object distances, the received radiation bundle at the axial position of the receiver 10 is substantially larger in diameter than the receiver, whereby a large part of the received radiation 5 is lost. In the case of reflective target objects, this effect is advantageous since the signal is sufficiently strong and does not grow further at short distances, and therefore the amplitude dynamics of the received signal remain in a reasonable modulation range. In contrast, in the case of diffusely scattering surfaces, on the one hand, the headlight limit distance is approximately twice as long as in the case of retroreflective targets and, on the other hand, it is smaller because of the optical scattering. To now elevate the received signal in the case of diffusely scattering targets and thus increase the signal-to-noise ratio, for example, an additional close-range optical unit 11 is placed in the vicinity of the aperture of the receiving lens 12. Different correction optical units 11 for the close-range distance are known in the prior art, for example, based on optical wedges in a plane plate or directly integrated with the receiving lens, wherein, for example, the optical path in the wedge region is identical to the path in the carrier plate.

In the case of targeting on a retroreflector 6, as shown in FIG. 1b, the transmitted beam 2 is mirrored optically perfectly and reflected to the beam splitter 3 parallel to the optical axis. The partially-transparent layer 4 having a partial transmission of, for example, 30% conducts the received radiation 5 onto the receiving objective 9, which focuses the radiation onto the receiver 10.

In the case of targeting adjacent to the center of the retroreflector 6, a lateral offset of the reflected beam 5 in relation to the optical target axis results. The received bundle is thus incident adjacent to the partially-transparent layer of the beam splitter and under certain circumstances can be incident on the close-range optical unit 11, which is designed for reflector-less distance measurement. Since the close-range optical unit 11 is designed for diffuse targets within close distances of a few meters, the light reflected from a retroreflector is deflected in an uncontrolled manner into the receiver space, which can result in uncontrolled scattered light and thus inaccurate distance measurements. In order that this does not occur, according to the invention, in the measuring mode for measurements on retroreflectors, the receiving aperture is adapted, for example, using a screen 13 which is pivotable in, such that the receiving aperture is reduced to the central zone 7. The radiation outside the central zone 7 is thus hidden for the receiver. A uniquely defined state is thus optically achieved and the length of the optical paths in the received beam path are all interferometrically of equal length, whereby a very high measurement accuracy is achieved, for example, accurate up to 1 μm.

To further ensure the high measurement accuracy, in the case of measurements on retroreflectors 6, for example, an attenuation filter 14 is additionally pivoted into the beam path in the receiving channel. This causes a suppression of multiple reflections between receiver 10 and retroreflector 6 (receiver-side anti-boomerang filter) and can be integrated, for example, as shown in the figure directly into the screen 13 which is pivotable in.

Figure 2:
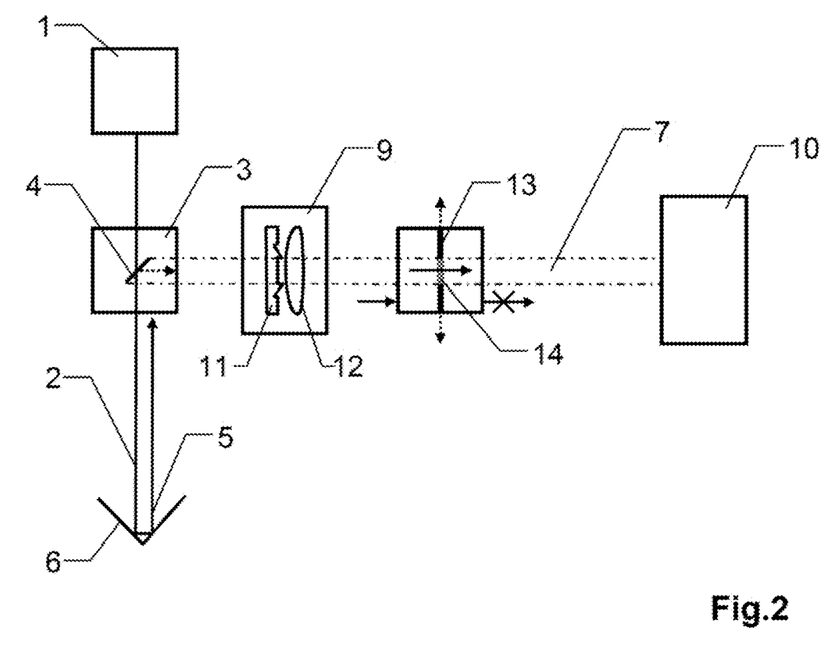
FIG. 2: shows a schematic illustration of a further embodiment of the optical distance meter according to the invention.

FIG. 2 shows a further embodiment variant of the optical distance meter according to the invention. In contrast to FIGS. 1a, 1b, the beam splitter 3 having the partially-transparent layer 4 is designed such that the transmitted beam 2 passes the beam splitter 3 in transmission and the received radiation 5 passes the beam splitter 3 in reflection. For example, in this case the transmission of the transmitted beam 2 at the beam splitter 3 in the region of the central zone 7 is greater than 50% and the net transmission for the received radiation is less than 50%.

Figure 3:
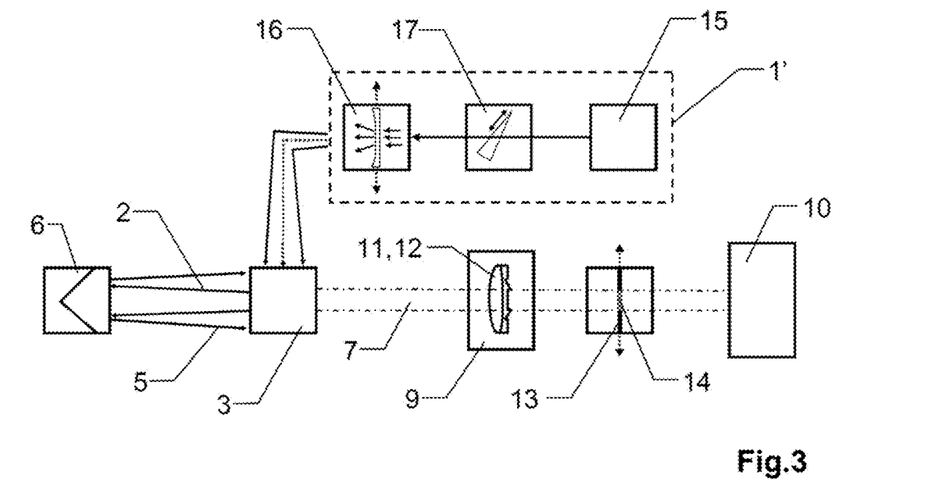
FIG. 3: shows a schematic illustration of a further embodiment of the optical distance meter according to the invention in a configuration for retroreflective target objects.

FIG. 3 shows a schematic illustration of a further embodiment of the optical distance meter according to the invention in a configuration for retroreflective target objects 6.

The targeting of the center of a retroreflector 6 by means of a transmitter-side collimated, substantially parallel laser beam 2 requires a high-precision and complex targeting process. In the event of incorrect targeting in relation to the reflector 6, the back-reflected beam 5 has a beam offset in relation to the optical axis of the receiving channel and the receiving optical unit 9 is only struck partially or not at all. This results in undesired signal variations and blocks unpredictable parts of the measurement beam, which results in distance measurement inaccuracies and measurement interruptions.

To prevent this, the transmitter 1' is configured to generate the transmitted beam 2 having a beam divergence variable in a defined manner. For example, for this purpose a beam-widening optic 16 is pivoted into the transmitting channel after the laser beam source 15, for example, a negative lens, a light-diffracting perforated screen, or a diffractive optical element, whereby the beam divergence is widened. The beam divergence is set in this case, for example, such that it at least corresponds to the divergence angle of the receiver-side field of vision. This causes the retroreflected beam 5 to irradiate the complete opening of the receiving channel from the receiver-side headlight limit distance, even if incorrect targeting in relation to the center of the retroreflector 6 is present.

For example, the angles of the receiver-side field of vision are 1 to 3 mrad. If the transmission divergence is 5 mrad, the cross section of the retroreflected received bundle is then already 10 mm at a corner cube distance of 1 m and completely covers the central zone 7 relevant in the first measuring mode.

Due to the elevation of the transmitter-side divergence, deviations of the modulation wavefront, which determines the runtime, of the optical pulses are locally smoothed by so-called lateral zooming, systematic spatial errors which arise due to incorrect targeting in relation to the center of a reflector 6 are thus reduced.

Furthermore, for example, as shown in the figure, a further anti-boomerang filter 17 in the form of a settable attenuation filter, for example, a graduated filter wheel, can also be installed in the transmitting channel.

Figure 4:
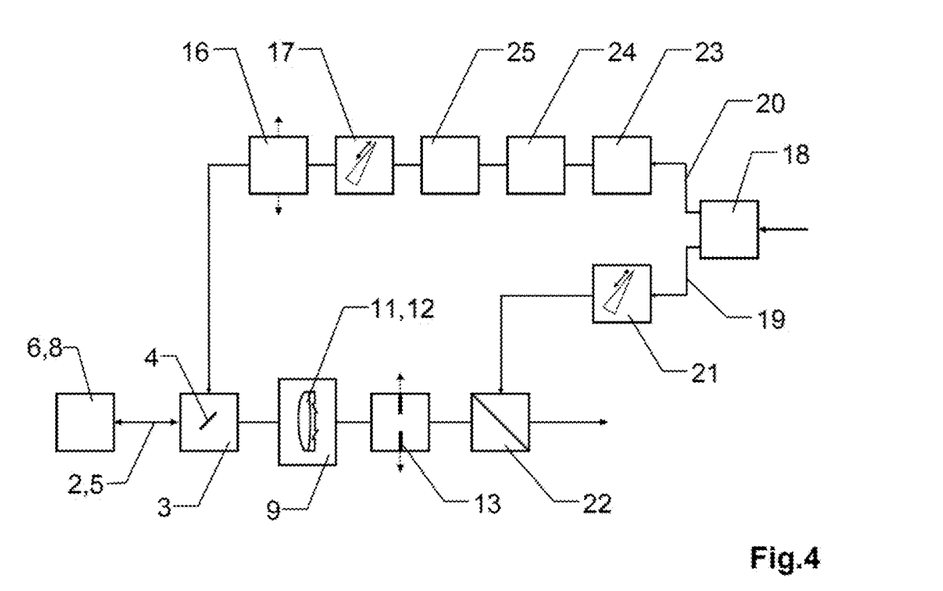
FIG. 4: shows a schematic illustration of a further embodiment of the optical distance meter according to the invention having fiber-optic construction both in the starting channel and also in the receiving channel.

FIG. 4 schematically shows a further embodiment having fiber-optic construction both in the starting channel and also in the receiving channel.

For example, fiber-coupled laser diodes, fiber lasers, or seeded fiber amplifiers can be used as the radiation source. The generated radiation is allocated by means of a fiber coupler 18 into a starting path 19 and a transmitting path 20 (TX path).

All fibers in the transmitting path are, for example, single mode fibers or PM fibers (polarization-containing). The radiation in the starting path 19 is coupled internally in the device via, for example, an electrically settable attenuation filter 21, for example, a gray wedge or a fiber-optic Mach-Zehnder interferometer, via a beam splitter 22 onto the receiving channel. An optical reference signal is generated via the starting path 19, which defines the exact starting time of the measurement signal, for example, of the measurement pulse for a pulse runtime measurement or phase measurement.

Moreover, the systematic signal-strength-dependent distance measuring error (range walk) can be continuously determined by means of the graduated filter 21. In this case, for example, the recorded distance offsets are recorded in a lookup table and are subsequently used during following distance measurements for the compensation of ascertained raw distances.

The transmitting channel 20 (TX path) embodied in fiber optics is equipped, for example, with a variable optical attenuator 23 (VOA). Typical fiber-optic attenuators 23 are based, for example, on acoustooptical modulators (AOM) or electrooptical modulators (EOM) having setting speeds of several microseconds up to 100 ns. For example, the signal amplitude can thus be set precisely from measurement to measurement at a measuring rate of up to 10 MHz. In this case, the transfer time is hardly dependent on the attenuation setting, whereby the absolute distance is hardly corrupted. Of course, however, a range walk correction can also be ascertained here and taken into consideration in each case during the final distance correction.

Subsequently, the transmitted radiation is transferred in the transmitting channel via a delay route 24, for example, a 10 m delay fiber, via an angle-faceted fiber collimator 25 into a free beam. The delay route has the effect, for example, of letting the electronic crosstalk on the receiver abate before the measurement signal reaches it.

The use of single-mode fibers has the advantage, for example, of lower dispersion, whereby the transmitted signals are not widened. A delay fiber which is several meters long therefore does not generate pulse distortion and thus does not generate distance errors.

On the receiver side, in contrast, because of the spatial phase mixture in the beam bundle generated by rough target surfaces, multimode fibers typically have to be used. The use of multimode fibers as delay fibers has the disadvantage, for example, of greater dispersion, however, which generates distance-dependent errors in particular in the case of fixed focus optical units.

Furthermore, for example, an electrically settable attenuation filter 17, for example, a gray wedge wheel, optionally acts as a transmitter-side anti-boomerang filter 17.

As an alternative to FIG. 3, as a further example, instead of a mechanically pivotable divergence lens, a switchable diffractive optical element (DOE) or an electrooptically activatable spatial light modulator (SLM) is used for the settable beam widening 16 here.

The receiving channel is equipped, for example, with a multimode fiber, which conducts the received light to the receiver (not shown). Furthermore, in the example shown, a receiver-side anti-boomerang filter is omitted, since a diagonally-faceted fiber can be used as a further anti-boomerang measure, for example.

Figure 5:
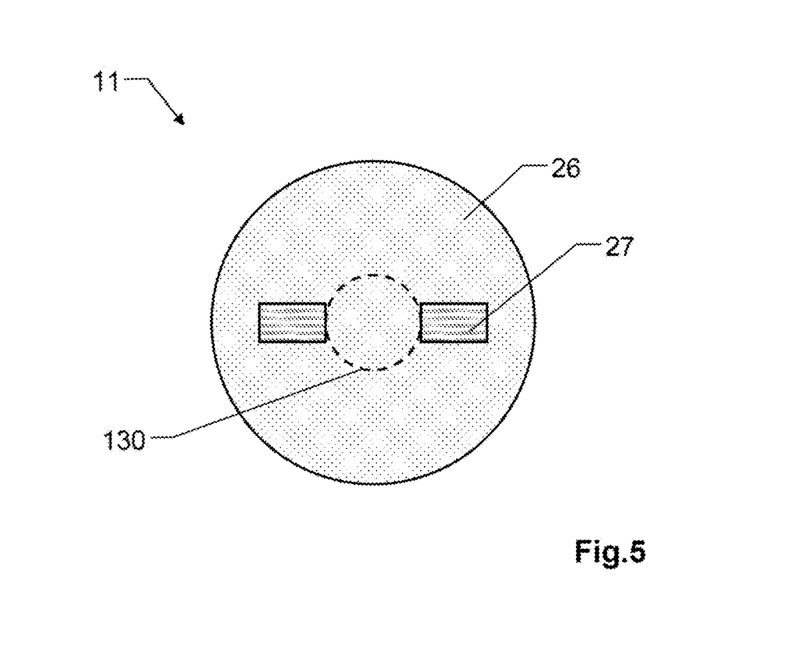
FIG. 5: shows a schematic illustration of a correction optical unit in the receiving channel.

FIG. 5 shows an embodiment of a correction optical unit for use in an optical distance meter according to the present invention. It consists, for example, of a plane plate 26, which has, for example, inlaid optically active regions 27 having corrective effect, for example, optical wedges, cylindrical lenses, optical units having free-form surfaces, sliding refractive force surfaces, Fresnel structures, or diffractive structures. The parts of the received radiation passing the optically active regions 27 are thus deflected onto the receiver 10 (FIG. 1a) to form a correction zone in the receiving channel for compensation of a focusing error during the focusing of parts of the received radiation returning from a distance shorter than a defined close-range limit distance. Considered alternatively, the optically active regions 27 expand the receiver-side field of vision (RX-FOV), and therefore the measurement light spot on the target object can be seen even at short distances.

The effect of the screen 13 which is pivotable in on the beam bundle at the location of the correction optical unit 11 is illustrated by means of the shaded line 130, which represents the first aperture in the first measuring mode. The second aperture (with pivoted-out screen 13) substantially comprises the entire free opening of the correction optical unit 11.

Figure 6A:
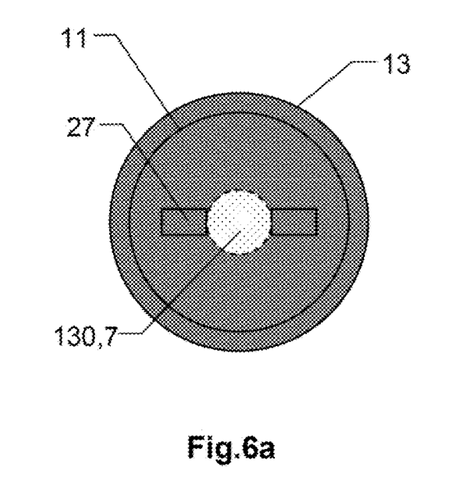
FIGS. 6a, b: show a schematic illustration of the joint effect of the correction optical unit together with the switchable aperture screen according to the invention in the receiving channel.
Figure 6B:
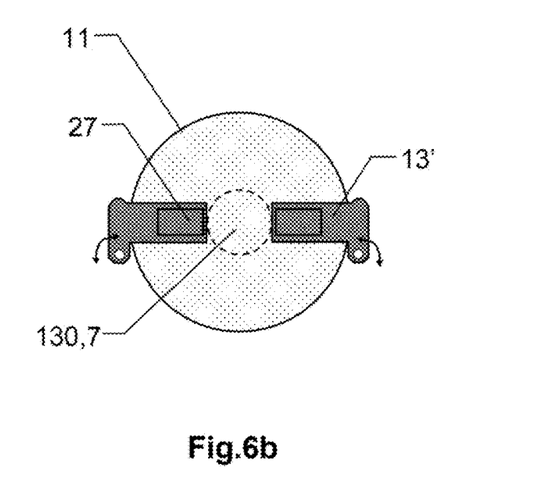

FIGS. 6a and 6b show a schematic illustration of the joint action of the correction optical unit 11 together with the switchable aperture screen according to the invention in the receiving channel in the so-called footprint illustration. In this illustration, the beam bundles are projected in a common plane perpendicular to the optical axis. In this case, the effect of multiple optical components in the system and the mutual arrangement thereof along the optical axis are visible.

The figures relate to two embodiments of the switchable aperture screen 13, 13' and each show the two essential cross sections of the receiving bundles in the setting for retroreflective targets. The central zone 7 defined by the fixedly arranged attenuation element 4 (FIG. 1a) is not captured in this case by the optically active regions 27 of the correction optical unit 11, and here is thus substantially inside the first aperture 130 defined by the switchable aperture screen.

As shown in FIG. 6a, the switchable aperture screen 13 generates the first aperture 130 and causes beam bundles of the received radiation located in just this central zone 7 relevant for reflector measurements not to pass any further optical components (except for the first aperture 130). Furthermore, the fixedly arranged attenuation element 4 also acts at the same time as the close-range optical unit for reflector measurements, and therefore even in the case of short distances at close range, sufficient signal is present for accurate measurements.

In the case of reflector-less targets, the aperture is typically to be as large as possible and the switchable aperture screen 13 is pivoted out. In addition to the bundle of the central zone 7, the light bundle now also reaches the receiver via the entire correction optical unit 11. Moreover, the switchable attenuation element 14 is also pivoted out, and therefore the distance measurement signal rises further.

The optical system is designed such that all beam paths have the same optical length, regardless of whether they pass via the central zone 7, the optically active regions 27 of the correction optical unit 11, or outside these zones.

To furthermore also increase the reception signal still further in the case of reflector measurements, for example, in the case of measurements at long distances, where boomerang effects automatically become less due to the reduced received signal, the switchable attenuation element 14 can optionally be pivoted out of the beam path of the receiving channel, whereby the signal-to-noise ratio is enlarged once again.

FIG. 6b shows cross sections of the received bundle according to a further embodiment of the switchable aperture screen 13'. In this example, the switchable aperture screen 13' consists of two segments which each only show or hide the optically active regions 27 of the correction optical unit 11. The retroreflective beam bundle is attenuated less in this case in the receiver than in the embodiment shown in FIG. 6a, but has the disadvantage, for example, of possible scattered light at close range in the case of very short measurement distances.

Figure 7:
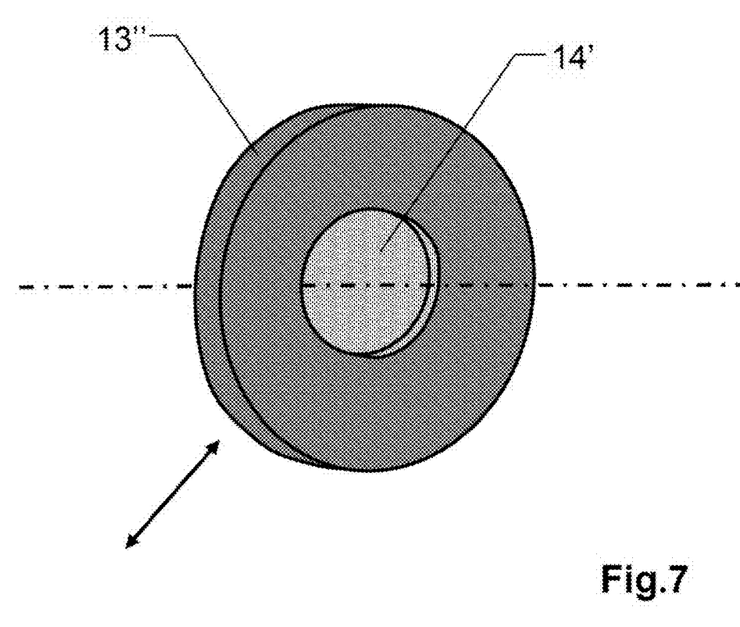
FIG. 7: shows a schematic illustration of a further embodiment of the switchable optical aperture screen according to the invention in the receiving channel.

FIG. 7 shows an embodiment of the switchable aperture screen 13" combined with an attenuation element 14' integrated into the switchable aperture screen 13", which therefore simultaneously forms the switchable attenuation element according to the invention. The combination of the two components according to the invention in a single assembly has the advantage, for example, that a single actuator unit is sufficient, whereby less space is required.

In the first measuring mode for retroreflective targets, this unit according to the invention is pivoted into the received beam, and therefore the central zone 7 (FIG. 1a) is conducted as homogeneously and axially-close as possible from the beam splitter 3 up to the receiver 10.

In the second measuring mode for natural, diffusely scattering surfaces, the combined component is pivoted out of the received beam path, and therefore both in the case of measurements at short and also at long object distances, as much radiation as possible is captured and guided onto the receiving unit.

It is apparent that these illustrated figures only schematically illustrate possible exemplary embodiments. The various approaches can also be combined with one another and with methods of the prior art.

What is claimed is:

1. An optical distance meter comprising:
   a transmitter configured to generate an oriented, transmitted beam defining a target axis,
   a receiver, configured to capture at least a part of the transmitted beam returning from the target, referred to hereafter as received radiation, and
   a receiving channel, which substantially defines a single capture direction for capturing the received radiation,
   wherein the distance meter is configured to carry out a distance measurement by means of the transmitted beam in:
      a first measuring mode, in which the distance meter is set for distance measurement on a retroreflective target, and
      a second measuring mode, in which the distance meter is set for distance measurement on a diffusely scattering target,
   wherein the receiving channel is configured such that, for the capture of the received radiation:
   in the first measuring mode, a first aperture of the receiving channel is set, namely a first free opening of the receiving channel through which the part of the received radiation used for the distance measurement in the first measuring mode passes,
   in the second measuring mode, a second aperture of the receiving channel is set, namely a second free opening of the receiving channel through which the part of the received radiation used for the distance measurement in the second measuring mode passes,
   wherein the first aperture is smaller than the second aperture,
   the receiving channel has a fixedly arranged attenuation element, optionally identically present in the first and second measuring mode, for attenuating the received radiation passing through the attenuation element, and
   the fixedly arranged attenuation element is configured in its lateral geometry and arranged in its lateral position in the receiving channel such that:
   the fixedly arranged attenuation element at least attenuates the beam bundle of the received radiation passing through the first aperture in the first measuring mode, and
   in the second measuring mode, received radiation passing through the second aperture has beam bundles not attenuated by the fixedly arranged attenuation element,
   the distance meter has a beam splitter arranged on the optical axis of the receiving channel for coupling the transmitted beam onto an axis which is coaxial to the optical axis of the receiving channel and corresponds to the target axis,
   the beam splitter is configured and arranged such that the beam splitter has a partially-transparent layer in a central zone around the optical axis of the receiving channel, and
   the partially-transparent layer forms at least a part of the fixedly arranged attenuation element.

2. The optical distance meter according to claim 1, wherein the receiving channel has an attenuation element which is switchable in dependence on carrying out the first and second measuring mode, namely differently present in the first and second measuring mode.

3. The optical distance meter according to claim 1, wherein the receiving channel has a switchable aperture screen defining the first aperture, wherein the switchable aperture screen is configured such that
   the switchable aperture screen is pivoted into the beam path of the receiving channel in the first measuring mode, or the screen opening of the switchable aperture screen is settable such that the first aperture is set by means of a first setting and the second aperture is set by means of a second setting.

4. The optical distance meter according to claim 3, wherein the switchable attenuation element and the switchable aperture screen are arranged on a common adjustment element of the receiving channel and are thus jointly pivoted into the beam path of the receiving channel in the first measuring mode or jointly pivoted out of the beam path of the receiving channel in the second measuring mode, respectively.

5. The optical distance meter according to claim 1, wherein the receiving channel has a correction optical unit defining a correction zone of the receiving channel, for compensation of a focusing error during the focusing of parts of the received radiation returning from a distance shorter than a defined close range limit distance onto the receiver, namely wherein parts of the received radiation located in the correction zone are deflected by the correction optical unit onto the receiver.

6. The optical distance meter according to claim 1, wherein the transmitter is configured to set the transmitted beam in a defined variable focusing state, wherein:
in the first measuring mode, a first focusing state of the transmitted beam is set, wherein the transmitted beam has a divergence in the first focusing state, and
in the second measuring mode, a second focusing state of the transmitted beam is set, wherein the transmitted beam substantially has a parallel beam propagation in the second focusing state.

7. The optical distance meter according to claim 1, wherein the transmitter is configured such that, in the first measuring mode, the transmitted beam has a defined settable beam divergence.

8. The optical distance meter according to claim 1, wherein a transmitting channel of the optical distance meter has a switchable attenuation element.

9. The optical distance meter according to claim 1, wherein the ratio between the area of the first aperture and the area of the second aperture is less than 1/10.

10. The optical distance meter according to claim 1, wherein the receiving channel has an attenuation element which is switchable in dependence on carrying out the first and second measuring mode, namely differently present in the first and second measuring mode.

11. The optical distance meter according to claim 1, wherein the switchable attenuation element and the switchable aperture screen are arranged on a common adjustment element of the receiving channel and are thus jointly pivoted into the beam path of the receiving channel in the first measuring mode or jointly pivoted out of the beam path of the receiving channel in the second measuring mode, respectively.

12. The optical distance meter according to claim 1, wherein:
the receiving channel has a fixedly arranged attenuation element, namely identically present in the first and second measuring mode, for attenuating the received radiation passing through the attenuation element, and
the fixedly arranged attenuation element is configured in its lateral geometry and arranged in its lateral position in the receiving channel such that:
the fixedly arranged attenuation element at least attenuates the beam bundle of the received radiation passing through the first aperture in the first measuring mode, and
in the second measuring mode, received radiation passing through the second aperture has beam bundles not attenuated by the fixedly arranged attenuation element.

13. The optical distance meter according to claim 12, wherein
the distance meter has a beam splitter arranged on the optical axis of the receiving channel for coupling the transmitted beam onto an axis which is coaxial to the optical axis of the receiving channel and corresponds to the target axis,
the beam splitter is configured and arranged such that the beam splitter has a partially-transparent layer in a central zone around the optical axis of the receiving channel, and
the partially-transparent layer forms at least a part of the fixedly arranged attenuation element.

14. The optical distance meter according to claim 1, wherein the transmitter is configured to generate the transmitted beam having a beam divergence in the first measuring mode, and therefore:
when the distance measurement is carried out at a defined minimum measurement distance, the first aperture is completely illuminated by the received radiation, and
the beam divergence is less than five times the receiver-side field of vision angle.

15. An optical distance meter comprising:
a transmitter configured to generate an oriented, transmitted beam defining a target axis
a receiver, configured to capture at least a part of the transmitted beam returning from the target, referred to hereafter as received radiation, and
a receiving channel, which substantially defines a single capture direction for capturing the received radiation,
wherein the distance meter is configured to carry out a distance measurement by means of the transmitted beam in:
a first measuring mode, in which the distance meter is set for distance measurement on a retroreflective target, and
a second measuring mode, in which the distance meter is set for distance measurement on a diffusely scattering target,
wherein the receiving channel is configured such that, for the capture of the received radiation:
in the first measuring mode, a first aperture of the receiving channel is set, namely a first free opening of the receiving channel through which the part of the received radiation used for the distance measurement in the first measuring mode passes,
in the second measuring mode, a second aperture of the receiving channel is set, namely a second free opening of the receiving channel through which the part of the received radiation used for the distance measurement in the second measuring mode passes,
wherein the first aperture is smaller than the second aperture,
wherein the receiving channel has a switchable aperture screen defining the first aperture, wherein the switchable aperture screen is configured such that:
the switchable aperture screen is pivoted into the beam path of the receiving channel in the first measuring mode, or
the screen opening of the switchable aperture screen is settable such that the first aperture is set by means of a first setting and the second aperture is set by means of a second setting;

wherein:
the receiving channel has a fixedly arranged attenuation element, optionally identically present in the first and second measuring mode, for attenuating the received radiation passing through the attenuation element, and
the fixedly arranged attenuation element is configured in its lateral geometry and arranged in its lateral position in the receiving channel such that:
the fixedly arranged attenuation element at least attenuates the beam bundle of the received radiation passing through the first aperture in the first measuring mode, and
in the second measuring mode, received radiation passing through the second aperture has beam bundles not attenuated by the fixedly arranged attenuation element;
wherein the receiving channel has a correction optical unit defining a correction zone of the receiving channel, for compensation of a focusing error during the focusing of parts of the received radiation returning from a distance shorter than a defined close range limit distance onto the receiver, namely wherein parts of the received radiation located in the correction zone are deflected by the correction optical unit onto the receiver;
wherein the fixedly arranged attenuation element, the correction optical unit, and the switchable aperture screen are arranged in relation to one another and are each configured in the lateral geometry thereof such that:
in the first measuring mode, substantially the entire received radiation incident on the receiver is attenuated by the fixedly arranged attenuation element and is located outside the correction zone, and
in the second measuring mode, the aperture screen is pivoted out of the beam path of the receiving channel and received radiation passing through the second aperture has beam bundles not attenuated by the fixedly arranged attenuation element, which are simultaneously located inside the correction zone.

16. The optical distance meter according to claim 15, wherein the receiving channel has an attenuation element which is switchable in dependence on carrying out the first and second measuring mode, namely differently present in the first and second measuring mode.

17. The optical distance meter according to claim 15, wherein:
the receiving channel has a fixedly arranged attenuation element, namely identically present in the first and second measuring mode, for attenuating the received radiation passing through the attenuation element, and
the fixedly arranged attenuation element is configured in its lateral geometry and arranged in its lateral position in the receiving channel such that:
the fixedly arranged attenuation element at least attenuates the beam bundle of the received radiation passing through the first aperture in the first measuring mode, and
in the second measuring mode, received radiation passing through the second aperture has beam bundles not attenuated by the fixedly arranged attenuation element.

18. The optical distance meter according to claim 17, wherein
the distance meter has a beam splitter arranged on the optical axis of the receiving channel for coupling the transmitted beam onto an axis which is coaxial to the optical axis of the receiving channel and corresponds to the target axis,
the beam splitter is configured and arranged such that the beam splitter has a partially-transparent layer in a central zone around the optical axis of the receiving channel, and
the partially-transparent layer forms at least a part of the fixedly arranged attenuation element.

19. The optical distance meter according to claim 15, wherein the transmitter is configured to generate the transmitted beam having a beam divergence in the first measuring mode, and therefore:
when the distance measurement is carried out at a defined minimum measurement distance, the first aperture is completely illuminated by the received radiation, and
the beam divergence is less than five times the receiver-side field of vision angle.

20. An optical distance meter comprising:
a transmitter configured to generate an oriented, transmitted beam defining a target axis,
a receiver, configured to capture at least a part of the transmitted beam returning from the target, referred to hereafter as received radiation, and
a receiving channel, which substantially defines a single capture direction for capturing the received radiation,
wherein the distance meter is configured to carry out a distance measurement by means of the transmitted beam in:
a first measuring mode, in which the distance meter is set for distance measurement on a retroreflective target, and
a second measuring mode, in which the distance meter is set for distance measurement on a diffusely scattering target,
wherein the receiving channel is configured such that, for the capture of the received radiation:
in the first measuring mode, a first aperture of the receiving channel is set, namely a first free opening of the receiving channel through which the part of the received radiation used for the distance measurement in the first measuring mode passes,
in the second measuring mode, a second aperture of the receiving channel is set, namely a second free opening of the receiving channel through which the part of the received radiation used for the distance measurement in the second measuring mode passes,
wherein the first aperture is smaller than the second aperture,
wherein the transmitter is configured to generate the transmitted beam having a beam divergence in the first measuring mode, and therefore:
when the distance measurement is carried out at a defined minimum measurement distance, the first aperture is completely illuminated by the received radiation, and
the beam divergence is less than five times the receiver-side field of vision angle.

* * * * *